(12) United States Patent
Hashiba

(10) Patent No.: US 7,906,569 B2
(45) Date of Patent: Mar. 15, 2011

(54) METHOD FOR PRODUCTION OF MOLDED ARTICLE OF PLANT-DERIVED COMPOSITE MATERIAL, MOLDED ARTICLE OF PLANT-DERIVED COMPOSITE MATERIAL, METHOD FOR PRODUCTION OF PLANT-DERIVED COMPOSITE MATERIAL, AND PLANT-DERIVED COMPOSITE MATERIAL

(75) Inventor: Masanori Hashiba, Kariya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 55 days.

(21) Appl. No.: 12/444,716

(22) PCT Filed: Sep. 21, 2007

(86) PCT No.: PCT/JP2007/068457
§ 371 (c)(1),
(2), (4) Date: Apr. 8, 2009

(87) PCT Pub. No.: WO2008/044457
PCT Pub. Date: Apr. 17, 2008

(65) Prior Publication Data
US 2010/0004358 A1    Jan. 7, 2010

(30) Foreign Application Priority Data

Oct. 11, 2006 (JP) .................................. 2006-278089

(51) Int. Cl.
*C08L 97/00* (2006.01)
(52) U.S. Cl. .................. 524/9; 524/13; 524/14; 524/15; 524/16; 524/27; 524/28; 524/29; 524/30; 524/31; 524/35
(58) Field of Classification Search .......... 524/9, 13–16, 524/27–31, 35
See application file for complete search history.

(56) References Cited

FOREIGN PATENT DOCUMENTS

| | | |
|---|---|---|
| DE | 10032804 | 2/2001 |
| JP | 2000-127280 A | 5/2000 |
| JP | 2000-219812 A | 8/2000 |
| JP | 2004-315577 A | 11/2004 |
| JP | 2005-014499 A | 1/2005 |
| JP | 2005-131807 A | 5/2005 |
| JP | 2006-056187 A | 3/2006 |
| WO | 03/103912 A1 | 12/2003 |

OTHER PUBLICATIONS

English language Abstract and translation of JP 2005-014499 A, Jan. 20, 2005.
English language Abstract and translation of JP 2006-056187 A, Mar. 2, 2006.
English language Abstract and translation of JP 2005-131807 A, May 26, 2005.
English language Abstract and translation of JP 2004-315577 A, Nov. 11, 2004.
English language Abstract and translation of JP 2000-127280 A, May 9, 2000.
English language Abstract and translation of JP 2000-219812 A, Aug. 8, 2000.
Chinese Office Action dated Sep. 15, 2010 that issued with respect to Chinese Patent Application No. 200780028189.3, along with an English language translation.
Extended European Search Report dated Oct. 19, 2010 that issued with respect to European Patent Application No. 07807787.2.

*Primary Examiner* — Peter Szekely
(74) *Attorney, Agent, or Firm* — Greenblum & Bernstein, P.L.C.

(57) ABSTRACT

The present invention provides a method for production of a molded article comprising a plant-derived composite material in which a plant-derived material is evenly dispersed and a plant-derived composite material molded article prepared therewith, and a method for production of a plant-derived composite material in which a plant-derived material is evenly dispersed and a plant-derived composite material prepared therewith. The present method for production of a molded article is a method for producing a molded article composed of a plant-derived composite material comprising a plant-derived material (e.g., a kenaf core) and a thermoplastic resin (e.g., polypropylene, polylactic acid), and comprises a process in which the plant-derived material is pressed to obtain raw-material pellets, a process in which the raw-material pellets and the thermoplastic resin are kneaded to obtain a plant-derived composite material, and a process in which the plant-derived composite material is molded into a molded article composed of the plant-derived composite material. The present molded article is obtained by the method.

6 Claims, No Drawings

METHOD FOR PRODUCTION OF MOLDED ARTICLE OF PLANT-DERIVED COMPOSITE MATERIAL, MOLDED ARTICLE OF PLANT-DERIVED COMPOSITE MATERIAL, METHOD FOR PRODUCTION OF PLANT-DERIVED COMPOSITE MATERIAL, AND PLANT-DERIVED COMPOSITE MATERIAL

FIELD OF THE INVENTION

The present invention relates to a method for production of a molded article of a plant-derived composite material and a plant-derived composite material molded article prepared therewith, and a method for production of a plant-derived composite material and a plant-derived composite material prepared therewith. More particularly, the present invention relates to a method for production of a molded article comprising a plant-derived composite material in which a plant-derived material is evenly dispersed and a plant-derived composite material molded article prepared therewith, and a method for production of a plant-derived composite material in which a plant-derived material is evenly dispersed and a plant-derived composite material prepared therewith.

BACKGROUND ART

Recently, a plant resource such as kenaf, growing easily and having a large quantity of carbon dioxide absorption, has been noted from the aspect of reduction in carbon-dioxide emissions, fixation of carbon dioxide and the like. Such plant-derived resources have been expected to be a material for a molded article comprising a composite material with resin, a pulp and the like. For example, kenaf has an outer layer part referred to as a bast and a core material part referred to as a core or the like. Since the bast has tough fibers, the bast is of high utility value and usages thereof have been developed. On the other hand, the core has short fibers compared to the bast. Further the core has low specific gravity and is bulky compared to the bast. In the present circumstances, it is difficult to handle the core and to find utility values thereof, and hence, the core is discarded in many cases. Moreover, with respect to the kenaf, the core is on the order of 60% by volume based on the total volume of a stem of the kenaf whereas the bast accounts for 40% by volume, thus giving rise to a drawback that 60% by volume of the total volume of the kenaf is discarded. Now therefore, effective usages of not only the kenaf but also low-specific-gravity and bulky materials out of the various plant resources have been required. As a technique utilizing the plant resource by kneading together with resin, the following Patent Documents 1 and 2 which disclose a material obtained by kneading a plant-derived material with thermoplastic resin, a molded article making use of the material, and a method for production of the molded article and the like are known.
[Patent Document 1]
  Japanese Patent Application Publication No. JP-A 2000-127280
[Patent Document 2]
  Japanese Patent Application Publication No. JP-A 2000-219812

DISCLOSURE OF THE INVENTION

Problems that the Invention is to Solve

The techniques in the above-mentioned Patent Documents 1 and 2 are excellent in that a thermoplastic resin can be used in a larger amount than that of the resin to blend the plant-derived material and the resin. However, a composite material in Patent Document 1 is obtained by directly kneading wood flour with polypropylene without adjusting mutual specific gravity. Additionally, a composite material in Patent Document 2 is obtained by kneading pulp with the thermoplastic resin while the thermoplastic resin is fed into a banbury kneader, after the pulp is fed into the kneader in advance. That is, both of these composite materials are obtained by kneading a low-specific-gravity plant-derived material with high-specific-gravity resin without reducing a difference in specific gravity thereof. In such kneading methods, it is difficult to sufficiently disperse two materials having different specific gravities.

With respect to the composite materials obtained by directly kneading as above, sufficient strength can be obtained when the composite materials are used only for surface layers of building materials as described in Patent Document 1 or when the composite materials are used as containers for photosensitive materials and the like as disclosed in Patent Document 2. However, it is difficult to obtain such high strength requiring for interior materials for an automobile, integrated building materials and the like. In this respect, a composite material having further excellent dispersibility among a plant-derived material and a resin, and a method for production of the composite material have been required. Further, the plant-derived material has generally low specific gravity and is bulky in many cases. Accordingly, there is a drawback that a quantity of the plant-derived material which can be fed into a kneading machine at a time is limited and a quantity of the composite material which can be produced at a time is small. In this respect, a method for production of the composite material with higher production efficiency has been required.

The present invention is completed based on the above-mentioned description and an object of the present invention is to provide a method for production of a molded article composed of a plant-derived composite material in which dispersibility of a plant-derived material is high and the plant-derived material is more evenly dispersed than one by conventional methods and a plant-derived composite material molded article prepared therewith, and a method for production of a plant-derived composite material and a plant-derived composite material prepared therewith. In addition, another object of the present invention is to provide a method for production of the plant-derived composite material capable of manufacturing the plant-derived composite material efficiently.

Means for Solving the Problems

The present invention is as follows.
(1) A method for production of a molded article composed of a plant-derived composite material that comprises a plant-derived material containing at least one material selected from the group consisting of a ligneous material and a non-ligneous material, and a thermoplastic resin, the method being characterized by comprising:
  a pelletizing process in which the plant-derived material is pressed to obtain raw-material pellets,
  a kneading process in which the raw-material pellets and the thermoplastic resin are kneaded to obtain a plant-derived composite material, and
  a molding process in which the plant-derived composite material is molded into a molded article composed of the plant-derived composite material.

(2) The method for production of a plant-derived composite material molded article according to (1) above, wherein the plant-derived composite material contains the plant-derived material in an amount of 50% or more by weight when the plant-derived composite material is assumed to be 100% by weight in total.
(3) The method for production of a plant-derived composite material molded article according to (1) above, wherein the plant-derived material has apparent specific gravity lower than apparent specific gravity of the thermoplastic resin.
(4) The method for production of a plant-derived composite material molded article according to (2) above, wherein the plant-derived material has apparent specific gravity lower than apparent specific gravity of the thermoplastic resin.
(5) The method for production of a plant-derived composite material molded article according to (1) above, wherein a ratio of A to B (A/B) is 0.4 or less when the apparent specific gravity of the plant-derived material is expressed as A and the apparent specific gravity of the thermoplastic resin is expressed as B.
(6) The method for production of a plant-derived composite material molded article according to (2) above, wherein a ratio of A to B (A/B) is 0.4 or less when the apparent specific gravity of the plant-derived material is expressed as A and the apparent specific gravity of the thermoplastic resin is expressed as B.
(7) The method for production of a plant-derived composite material molded article according to (1) above, wherein a ratio of C to B (C/B) is 0.5 or more when the apparent specific gravity of the raw-material pellet is expressed as C and the apparent specific gravity of the thermoplastic resin is expressed as B.
(8) The method for production of a plant-derived composite material molded article according to (6) above, wherein a ratio of C to B (C/B) is 0.5 or more when the apparent specific gravity of the raw-material pellet is expressed as C and the apparent specific gravity of the thermoplastic resin is expressed as B.
(9) The method for production of a plant-derived composite material molded article according to (1) above, wherein the plant-derived composite material contains a core material of kenaf as the ligneous material.
(10) A plant-derived composite material molded article characterized in that the molded article is manufactured by the method according to (1) above.
(11) A plant-derived composite material molded article characterized in that the molded article is manufactured by the method according to (10) above.
(12) A method for production of a plant-derived composite material that comprises a plant-derived material containing at least one material selected from the group consisting of a ligneous material and a non-ligneous material, and a thermoplastic resin, the method being characterized by comprising:

a pelletizing process in which the plant-derived material is pressed to obtain raw-material pellets, and a kneading process in which the raw-material pellets and the thermoplastic resin are kneaded to obtain a plant-derived composite material.
(13) A plant-derived composite material characterized in that the material is manufactured by the method according to (12) above.

EFFECT OF THE INVENTION

According to the method for production of the molded article of the present invention, the method includes the pelletizing process in which the plant-derived material is pressed, thereby approximating specific gravity of the plant-derived material to specific gravity of the thermoplastic resin. Consequently, a difference in specific gravity between the plant-derived material and the thermoplastic resin can be reduced, and uneven distribution of the materials due to kneading can be suppressed. Accordingly, the plant-derived composite material molded article consisting of the plant-derived composite material in which the plant-derived material and the thermoplastic resin are mutually and evenly dispersed can be obtained. Further, the obtained plant-derived composite material molded article has high mechanical strength while containing the plant-derived material, and the quality of the obtained molded article can be improved. Further, since the plant-derived composite material can be efficiently manufactured, the molded article composed of the plant-derived composite material can also be efficiently manufactured. Therefore, the production efficiency can be improved.

In the case where the plant-derived composite material contains the plant-derived material in an amount of 50% or more by weight, an effect of usage of this method can be easily obtained in particular. Therefore, it is possible to mix a large quantity of the plant-derived material with the thermoplastic resin without uneven distribution.

In the case where the plant-derived material has apparent specific gravity lower than apparent specific gravity of the thermoplastic resin, an effect of usage of this method can be easily obtained. Therefore, it is possible to mix the plant-derived material whose specific gravity is smaller than that of the thermoplastic resin with the thermoplastic resin without uneven distribution.

In the case where a relationship between the apparent specific gravity A of the plant-derived material and the apparent specific gravity B of the thermoplastic resin is such that $A/B \leqq 0.4$, an effect of usage of this method can be easily obtained. Therefore, it is possible to mix the plant-derived material whose specific gravity is much smaller than that of the thermoplastic resin with the thermoplastic resin without uneven distribution.

In the case where a relationship between the apparent specific gravity C of the raw-material pellets and the apparent specific gravity B of the thermoplastic resin is such that $C/B \geqq 0.5$, the molded article can be obtained which is composed of the plant-derived composite material having particularly excellent uniformly dispersibility and particularly excellent mechanical strength. Moreover, the molded article can be manufactured with excellent production efficiency.

In the case where the plant-derived composite material contains a core material of kenaf as a ligneous material, the whole of the kenaf including not only bast of the kenaf but also a core material of the kenaf can be used as the plant-derived material. Accordingly, in addition to a fact that the core material which is conventionally discarded can be used, a pretreatment process can be remarkably reduced. Further, the cutting of other plants can be reduced, being favorable for conservation of natural environment.

According to the plant-derived composite material molded article of the present invention, the material is consisting of a plant-derived composite material in which the plant-derived material and the thermoplastic resin are mutually and evenly dispersed. Therefore, uneven distribution of constituent materials is suppressed, and high mechanical strength of the molded article can be obtained. Further, a variation in quality of the molded article can be prevented.

According to the method for production of a plant-derived composite material of the present invention, the plant-derived composite material in which the plant-derived material and the thermoplastic resin are mutually and evenly dispersed can be obtained. Consequently, when the plant-derived composite material is used, a molded article having high mechanical strength can be obtained in spite of containing the plant-derived material and the quality of the molded article can be improved. In addition, the plant-derived composite material can be efficiently manufactured and the production efficiency can be improved.

According to the plant-derived composite material of the present invention, a molded article having high mechanical strength can be obtained in spite of containing the plant-derived material and the quality of the molded article can be improved.

BEST MODE FOR CARRYING OUT THE INVENTION

Hereinafter, the present invention is described in detail.

[1] Method for Production of Molded Article of Plant-Derived Composite Material

The method for production of a plant-derived composite material molded article of the present invention is a method for production of a molded article composed of a plant-derived composite material that comprises a plant-derived material containing at least one material selected from the group consisting of a ligneous material and a non-ligneous material, and a thermoplastic resin and is characterized by comprising:

a pelletizing process in which the plant-derived material is pressed to obtain raw-material pellets, a kneading process in which the raw-material pellets and the thermoplastic resin are kneaded to obtain a plant-derived composite material, and a molding process in which the plant-derived composite material is molded into a molded article composed of the plant-derived composite material.

The "plant-derived material" is a natural material originated from a plant. The plant-derived material may include a ligneous material obtained from a woody part of a plant. In addition, the plant-derived material may include a non-ligneous material composed of a non-woody part of the plant, and may include both of the ligneous material and the non-ligneous material.

Further, a type of the plant constituting the plant-derived material is not limited in particular, and various plants can be used. Examples of the plant include kenaf, Manila hemp, sisal hemp, jute, cotton, Diplomorpha sikokiana, giant leaf paper plant, banana, pineapple, coconut palm, corn, sugarcane, bagasse, palm, papyrus, reed, esparto, sabai grass, oats, rice plant, bamboo, various coniferous trees such as Japanese cryptomeria and Japanese cypress, and the like. These plants may be used singly or in combination of two or more types thereof. Here, a part of the plant used for the plant-derived material is not limited in particular, and any part of the plant may be used. For example, a part of a stalk, a core material, a stem or the like may be used, and these parts may be used by mixing with each other.

The method for production of the molded article of the present invention is effective when a plant-derived material having lower apparent specific gravity (hereinafter, also referred to as merely "specific gravity") than the thermoplastic resin to be used is used. This is because, with this method, both of the plant-derived material and the thermoplastic resin can be dispersed more evenly than with conventional methods.

Examples of the plant from which the plant-derived material having low specific gravity is obtained, include kenaf, jute, bagasse and the like. These plants may be used singly or in combination of two or more types thereof. In general, the plant from which the plant-derived material having low specific gravity is obtained grows easily.

Further, the method for production of the molded article of the present invention is effective when the molded article contains a plant-derived material having low specific gravity compared to the thermoplastic resin. When the molded article contains the plant-derived material having low specific gravity compared to the thermoplastic resin, high dispersibility can be obtained compared to the conventional methods. A difference in specific gravity between the plant-derived material and the thermoplastic resin is not limited in particular. Here, the apparent specific gravity of the plant-derived material is expressed as A and the apparent specific gravity of the thermoplastic resin is expressed as B. In the case of $A/B \leqq 0.4$ (generally $A/B \geqq 0.05$), the method for production of the molded article of the present invention is further effective. When the molded article contains a low-specific-gravity plant-derived material such that $A/B \leqq 0.4$, it is particularly difficult to knead the plant-derived material with the thermoplastic resin, and the production efficiency is liable to lower. However, highly even dispersibility can be obtained by using the method for production of the molded article of the present invention, and the production efficiency is also improved. Example of the low-specific-gravity plant-derived material satisfying $A/B \leqq 0.4$ includes a core material of the kenaf. Further, with respect to $A/B$, when $0.05 \leqq A/B \leqq 0.3$, the method is more effective. And, when $0.07 \leqq A/B \leqq 0.25$, the method is especially effective.

Note that the specific gravity (apparent specific gravity) specified in the present invention is a specific gravity value which is measured in accordance with JIS Z 8807 (Measuring Methods for Specific Gravity of Solid, wherein the specific gravity values of the thermoplastic resin and the kenaf are measured by weighing in liquid and by using volume, respectively) under the condition of equilibrium moisture regain (10%).

The above-mentioned plant-derived material having low specific gravity may constitute the whole of the plant material, or may constitute only a part of the plant material. That is, the plant material may consist of only a plant-derived material having low specific gravity, and may contain a plant-derived material having low specific gravity as a part. Generally, a plant does not have uniform specific gravity as a whole, and has a high-specific-gravity part and a low-specific-gravity part. The low-specific-gravity part is short in fiber length and bulky. Accordingly, the low-specific-gravity part of the plant is inferior in operability, and when the thermoplastic resin contains the low-specific-gravity part of the plant, it is difficult to obtain sufficient dispersibility. Hence, the low-specific-gravity part is removed from the plant, and only a part having relatively high specific gravity is extracted to be mixed with the thermoplastic resin.

However, in the method for production of the molded article of the present invention, even when such a difference in specific gravity exists, the plant itself can integrally be used as the plant-derived material. Therefore, it is not necessary to perform a process in which materials are separated depending on the specific gravity. Also in this respect, the method is excellent in production efficiency.

Further, the method for production of the molded article of the present invention is effective when a plant contains a material part whose fiber length is short in a part or the whole thereof is used, and particularly effective when the plant contains a nonfibrous part. Example of the plant containing the nonfibrous part includes a plant having a woody part out of the plants which yield the plant-derived materials having low specific gravity and being bulky. That is, it is a plant that contains a large quantity of lignin and hemicellulose (for example, 10% or more by weight of the whole plant-derived material; generally 50% or less by weight) and/or a part of the plant. Example of the woody part includes a core material of kenaf, bamboo, bagasse, jute and the like. These woody parts may be used singly or in combination of two or more types thereof.

When the above-mentioned woody part is used, it is preferably in a granular state. Although the size of a grain is not limited, it is preferable that the woody part be used after pulverized into the maximum length of 5.0 mm or less (more preferably, 0.1 to 3.0 mm). Further, it is more preferable that the woody part is used as a plant-derived granular matter having an aspect ratio of 200 or less (generally, 1.0 or more).

Particularly, the above-mentioned kenaf has a core material which constitutes the low-specific-gravity woody part of approximately 50% or more by volume of the whole kenaf, however, the whole kenaf can be used which includes the core material thereof and only the core material of the kenaf can also be used according to the method for production of the molded article of the present invention.

The kenaf is an easy-growing annual grass having a woody stem and a plant classified into malvaceae in the present invention. The kenaf includes hibiscus cannabinus and hibiscus sabdariffa of scientific names, and further includes Indian hemp, Cuban kenaf, kenaf, roselle, mesta, bimli hemp, ambary hemp, Bombay hemp and the like of common names.

The above-mentioned "thermoplastic resin" is not limited in particular, and various thermoplastic resins can be used. For example, a polyolefin such as polypropylene and polyethylene, a polyester resin including an aliphatic polyester resin such as polylactic acid and polycaprolactone, and an aromatic polyester resin such as polyethylene terephthlate, polystyrene, a polyacrylic resin such as methacrylate and acrylate, a polyamide resin, a polycarbonate resin, a polyacetal resin and the like may be used. These resins may be used singly or in combination of two or more types thereof.

The above-mentioned polylactic acid includes poly-L-lactic acid containing L-lactic acid as a constitutional unit, poly-D-lactic acid containing D-lactic acid as a constitutional unit, poly-DL-lactic acid containing L-lactic acid and D-lactic acid as constitutional units, and mixtures of these polylactic acids. In addition, each of the poly-L-lactic acid, poly-D-lactic acid, and poly-DL-lactic acid may be a homopolymer by polymerization of only each kind of lactic acid, and may also be a copolymer by copolymerization of lactic acid and a monomer other than the lactic acid.

The plant-derived composite material used in the method for production of the molded article of the present invention contains the above-mentioned plant-derived material and the above-mentioned thermoplastic resin. A blending ratio between the plant-derived material and the thermoplastic resin is not limited in particular, it is preferable that the plant-derived composite material contain the plant-derived material and thermoplastic resin in an amount of 50% or more by weight (more preferably 70% to 99.5% by weight, 100% by weight may be acceptable) in total, with respect to the whole plant-derived composite material (100% by weight).

Further, the amount of the plant-derived material to be used is preferably 10% or more by weight (generally, 95% or less by weight) when the plant-derived material and the thermoplastic resin are assumed to be 100% by weight in total. When a composite material contains a plant-derived material in high concentration, that is, when the composite material contains the plant-derived material in an amount of 50% or more by weight (further, 70% or more by weight, generally, 95% or less by weight) with respect to 100% by weight of total of the plant-derived material and the thermoplastic resin, an improvement effect of the production efficiency with the method for production of the molded article of the present invention is obtained more remarkably.

Specifically, in a conventional method, for example, when a plant-derived material consisting of only the core material of the kenaf (granular matters obtained by pulverizing the core material of the kenaf) is used and the plant-derived material of 40% or more by weight is kneaded at the above-mentioned ratio, kneading itself cannot be performed and the core material of the kenaf and the thermoplastic resin are separated from each other. In the method of the present invention, both mixing and kneading can be performed and, in addition, excellent dispersibility can be obtained.

Note that, other components which can contain other ingredients than the plant-derived materials and the thermoplastic resin in the plant-derived composite material used in the method for production of the molded article of the present invention will be explained later.

The "pelletizing process" is a process in which the plant-derived material is pressed to obtain raw-material pellets. That is, it is a solidifying process in which the plant-derived material is pressed to be solidified. In an object that the difference in specific gravity between the plant-derived material and the thermoplastic resin is reduced, for example, the object is accomplished by pelletizing the plant-derived material with a solidification auxiliary agent such as a resin binder. However, when the plant-derived material is solidified with the resin binder or the like, pellets are directly dispersed in the thermoplastic resin as a result, and it is impossible to obtain the mutual dispersion of the plant-derived material and the thermoplastic resin. On the other hand, the pelletizing process in the method for production of the molded article of the present invention is performed by pressing the plant-derived material. The raw-material pellets pressed are collapsed in the course of kneading with the thermoplastic resin in the kneading process, thus dispersing the plant-derived material and the thermoplastic resin mutually and evenly.

The pelletizing process may be performed in any manner. A method for pelletizing is not limited in particular, and various compression forming methods can be used. Examples of the compression forming method include a forming method using a roller, a forming method using an extruder and the like. The forming method using a roller is a method with a roller type forming machine, in which the plant-derived material is pressed into a dice by a roller rotated while contacting with a die and thereafter, the plant-derived material is forced out of the dice to be formed. Examples of the roller type forming machine include a disk-die type machine (roller disk-die type forming machine) and a ring-die type machine (roller ring-die type forming machine) that are different in die shape to each other may be used. On the other hand, the forming method using an extruder is a method with an extruder type forming machine, in which the plant-derived material is pressed into a dice by rotation of a screw auger and thereafter, the plant-derived material is forced out of the dice to be formed. One or more of these forming methods may be used. In these forming methods, it is particularly preferable to use the method using the roller disk-die type forming machine. This forming machine has high compression efficiency, and is particularly suitable for the compression forming of the plant-derived material.

In the pelletizing process mentioned above, a degree of pressing is not limited in particular. However, it is preferable to press the plant-derived material such that C/B becomes 0.5 or more, more preferably 0.6 or more, further preferably 0.65 or more, and particularly 1.0 or more, when the apparent specific gravity of the raw-material pellet is expressed as C and the apparent specific gravity of the thermoplastic resin is expressed as B. In the case where C/B is 0.5 or more, it is possible to obtain high dispersibility compared to a case that the plant-derived material is fed into a kneader without being pressed. Further, it is possible to obtain the excellent production efficiency. Additionally, although the specific gravity of the raw-material pellet itself is not limited in particular, it is preferable that the specific gravity be in the range from 0.5 to 1.3, and more preferably from 0.7 to 1.25.

Moreover, the shape of the raw-material pellet is not limited in particular. The shape may be a columnar shape, a block shape, a spherical shape, a variable shape or the like. However, it is preferable that the maximum length of the raw-material pellet fall within a range from about 0.1 to 0.5 cm.

The "kneading process" is a process in which the plant-derived composite material is obtained by kneading the raw-material pellets with the thermoplastic resin. A kneading method in the kneading process is not limited in particular. In this process, for example, it is possible to perform kneading by use of a kneading machine including an extruder such as a single screw extruder and a twin screw extruder; a kneader; a mixer such as a high speed fluidizing mixer, a paddle mixer and a ribbon mixer, and the like. These machines may be used singly or in combination of two or more types thereof. Additionally, when two or more types of the kneading machines are used, the kneading machines may be continuously operated, or may be operated in a batched manner (batch-wise). Further, the raw-material pellets and the thermoplastic resin may be collectively kneaded, and may be kneaded step by step in a state where any one of the raw-material pellet and the thermoplastic resin may is additionally fed into the kneading machine in a plurality of times.

A kneading condition in the kneading process is not limited in particular, and the condition may be adopted depending on the type of the thermoplastic resin. For example, it is preferable that a kneading start temperature for polypropylene and polylactic acid be set to 170° C. or higher (more preferably, 180° C. to 200° C., generally, 230° C. or lower).

The "molding process" is a process in which the plant-derived composite material is molded into a molded article composed of the plant-derived composite material. In this molding process, the plant-derived composite material may be formed into a specific product of the molded article which does not need to be subsequently processed, or may be formed into a pellet or the like. In this molding process, a molding method is not limited in particular, and extrusion molding, injection molding, thermoforming (vacuum forming such as straight forming and drape forming), compression forming, calendering or the like may be used.

Further, in the molding process, a molding condition is not limited in particular, and the condition may be adopted depending on the type of the thermoplastic resin. For example, when the core material of the kenaf is used as a plant-derived material and, polypropylene is used as a thermoplastic resin, it is preferable that a forming temperature be set to a temperature of 170° C. or higher (more preferably, 170° C. to 200° C., generally, 230° C. or lower). Particularly, when the plant-derived composite material contains the core material of the kenaf in an amount of 50% or more by weight, it is preferable that the forming temperature be set to a temperature of 170° C. or higher (more preferably, 180° C. to 200° C., generally, 210° C. or lower).

Additionally, when the core material of the kenaf is used as a plant-derived material and, polylactic acid is used as a thermoplastic resin, it is preferable that the forming temperature be set to a temperature of 170° C. or higher (more preferably, 180° C. to 220° C., generally, 220° C. or lower). Particularly, when the plant-derived composite material contains the core material of the kenaf in an amount of 50% or more by weight, it is preferable that the forming temperature be set to a temperature of 170° C. or higher (more preferably, 170° C. to 190° C., generally, 200° C. or lower).

Each of the kneading process and molding process may be performed independently, or they may be performed as a series of contiguous processes. That is, an example for performing independently includes a method in which the plant-derived material and the thermoplastic resin are kneaded by the kneading machine to obtain a kneaded material and thereafter, the kneaded material obtained is fed into a molding machine to mold. On the other hand, as an example for performing as a series of contiguous processes includes in which a molding machine capable of kneading and molding in one apparatus is used. Specifically, in the case of using the molding machine, the raw-material pellets (plant-derived material) and the thermoplastic resin are kneaded in the molding machine, and subsequently forced out of this apparatus to be formed.

The method for production of the molded article of the present invention may also include other processes in addition to the pelletizing process, the kneading process and the molding process. Example of the other processes include a mixing process in which the raw-material pellets and the thermoplastic resin are mixed in a solidified state can be provided after the pelletizing process and before the kneading process. In the mixing process, it is preferable that the thermoplastic resin be used in a pellet shape and/or a powder state. With the provision of the mixing process, the raw-material pellets and thermoplastic-resin pellets (and/or powder) can be dispersed and premixed before the kneading process, thus effectively suppressing uneven dispersion of the materials after kneading.

A mixing method in the mixing process is not limited in particular. Mixing can be performed using a mixing machine such as a high speed fluidizing mixer, a paddle mixer, a ribbon mixer and a cone blender. These apparatus may be used singly or in combination of two or more types thereof. Additionally, when two or more types of the mixing machines are used, the mixing machines may be operated in a batched manner, or may be continuously operated. Further, the raw-material pellets and the thermoplastic resin may be collectively mixed, or may be mixed step by step in a state where any one of the raw-material pellets and the thermoplastic resin is additionally fed into the mixing machine in a plurality of times.

Moreover, a mixing condition in the mixing process is not limited in particular and may be adopted depending on the type of the thermoplastic resin. For example, mixing temperature for polypropylene is preferably 150° C. or lower (more preferably 130° C. or lower, and generally 25° C. or higher) and mixing temperature for polylactic acid is preferably 150° C. or lower (more preferably 130° C. or lower, and generally 25° C. or higher).

The method for production of the plant-derived composite material molded article of the present invention may also include other processes in addition to the pelletizing process, the mixing process, the kneading process and the molding process. Example of the other processes include a cutting process for uniformizing the plant-derived composite material molded article in appropriate size, a joining process for joining the molded article with other members, a compression-bonding process for bonding a decorative film or the like on the surface of the molded article by pressure, a painting process for painting the molded article and the like. The present method may comprise only one type of the processes or two or more types of the processes.

[2] Plant-Derived Composite Material Molded Article

The plant-derived composite material molded article of the present invention is characterized in that the molded article is manufactured by the method for production of a molded article of a plant-derived composite material of the present invention.

The shape, size, thickness and the like of the molded article of the present invention are not limited in particular, and applications thereof are not also limited. As this molded article, for example, a molding material (pellets or the like) may be used. Additionally, example thereof includes interior materials, exterior materials, structural materials and the like of an automobile, a railway vehicle, a marine vessel and an aircraft, and the like; that is, an automobile door trim, various instrument panels, a seat structural material, a seat-back board, a console box, an automobile dashboard, a deck trim, a bumper, a spoiler, a cowling and the like are exemplified. Further, example thereof includes interior materials, exterior materials and structural materials of a building, furniture and the like; that is, a door surface decorative material, a door structural material, and surface decorative materials, structural materials and the like of various types of furniture (a desk, a chair, a shelf, a chest and the like) are exemplified. In addition, a package, a container such as a tray, a protection member, a partition member and the like are also exemplified.

[3] Method for Production of Plant-Derived Composite Material

The method for production of the plant-derived composite material of the present invention is a method for production of a plant-derived composite material that comprises a plant-derived material containing at least one material selected from the group consisting of a ligneous material and a non-ligneous material, and a thermoplastic resin, and is characterized by comprising a pelletizing process in which the plant-derived material is pressed to obtain raw-material pellets, and a kneading process in which the raw-material pellets and the thermoplastic resin are kneaded to obtain a plant-derived composite material.

The present method is the same as a method which is provided by eliminating the molding process in the method for production of the molded article of the present invention. To the plant-derived composite material, the pelletizing process and the kneading process, the respective material and processes in the method for production of the molded article of the present invention can be applied without modification.

[4] Plant-Derived Composite Material

The plant-derived composite material of the present invention is characterized in that the material is manufactured by the method for production of the plant-derived composite material of the present invention. To the present material, the above-mentioned plant-derived composite material in the method for production of the molded article of the present invention can be applied without modification.

The plant-derived composite material of the present invention contains a plant-derived material containing at least one material of a ligneous material and a non-ligneous material, and a thermoplastic resin. It is preferable that the plant-derived composite material contain the plant-derived material in an amount of 50% or more by weight when the plant-derived composite material is assumed to be 100% by weight in total. Particularly, the plant-derived composite material may constitute a material that contains the above-mentioned ligneous material and in which the ligneous material is a core material of kenaf.

Further, the plant-derived composite material may contain other ingredients than the above-mentioned plant-derived material and the thermoplastic resin. The other ingredients include a filler material such as an extending agent and a reinforcing agent, an antistatic agent, an ultraviolet absorber, a weatherproof agent, an oxidant inhibitor, an age inhibitor, a flame retardant, a lubricant, an antibacterial agent, a coloring agent and the like.

As the above-mentioned filler material, an inorganic filler may be used. For example, calcium carbonate, talc, mica, synthetic silicic acid, silicate pigment and the like may be used. In addition, shapes of these inorganic fillers are not limited in particular. For example, a granular shape, a lamellate shape, an acicular shape or the like can be adopted. Further, the size of the inorganic filler is also not limited. For example, the inorganic filler having a grain size in the range from 100 nm to 10 μm is preferable.

EXAMPLE

Hereinafter, the present invention is explained in detail using Examples.

[1] Manufacturing of Plant-Derived Composite Material and Forming Thereof (Pelletization)

Example 1

Only a core material of kenaf was fed into a pulverizer to pulverize and collected in a collector, and a plant-derived material was obtained which was composed of the core material of the kenaf and having an average grain size of 200 μm and apparent specific gravity of 0.16.

After that, water was included in the obtained plant-derived material so that the moisture content was adjusted to approximately 15%. The plant-derived material was fed into a pelletizer (roller disk-die type forming machine "KP280" manufactured by KIKUKAWA IRON WORKS, INC., dice thickness: 55 mm) at a feed rate of 6 kg/hour to obtain raw-material pellets composed of the plant-derived material (the core material of the kenaf). The apparent specific gravity of the raw-material pellets obtained was 1.03.

Subsequently, 4 kg of the obtained raw-material pellets and 2.7 kg of polypropylene-resin pellets (average grain size: 3.0 mm, apparent specific gravity: 0.9) were fed into the SUPER-MIXER ("SMV-20A" manufactured by KAWATA MANUFACTURING CO., LTD.) having a capacity of 20 L to mix until a temperature in the inside of a furnace increases up to 130° C., and were collected in a collector and, thus, a mixture of the raw-material pellets and thermoplastic resin was obtained.

Then, the mixture obtained was fed into a twin screw extruder (manufactured by PLABOR Co., Ltd., φ30 mm, L/D=42) to extrude at a cylinder temperature of 190° C. and, thus, pellets composed of the plant-derived composite material (plant-derived material:thermoplastic resin=60:40 (% by weight)) were obtained.

Example 2

A plant-derived material composed of a core material of kenaf was obtained in the same manner as the above-mentioned Example 1.

After that, raw-material pellets were prepared in the same manner as the above-mentioned Example 1 except that the dice thickness was set to 23 mm. The apparent specific gravity of the raw-material pellets obtained was 0.7.

Subsequently, a mixture of the raw-material pellets and the thermoplastic-resin pellets was obtained in the same manner as the above-mentioned Example 1 except that 3 kg of raw-material pellets and 2 kg of polypropylene-resin pellets (average grain size: 3.0 mm, apparent specific gravity: 0.9) were used.

Then, the mixture obtained was extruded by the twin screw extruder in the same manner as the above-mentioned Example 1, and thus, pellets composed of the plant-derived composite material (plant-derived material:thermoplastic resin=60:40 (% by weight)) were obtained.

Example 3

A plant-derived material composed of a core material of kenaf was obtained in the same manner as the above-mentioned Example 1.

After that, raw-material pellets (apparent specific gravity: 1.03) were prepared in the same manner as the above-mentioned Example 1.

Subsequently, 6 kg of the raw-material pellets and 1.5 kg of polypropylene-resin pellets (average grain size: 3.0 mm, apparent specific gravity: 0.9) were fed into a melt kneading machine having a capacity of 40 L which is disclosed in WO2004-076044 to knead at a rate of 30 m/s for 70 seconds.

Then, the mixture obtained was extruded by the twin screw extruder in the same manner as the above-mentioned Example 1, and thus, pellets composed of the plant-derived composite material (plant-derived material:thermoplastic resin=80:20 (% by weight)) were obtained.

Example 4

A plant-derived material composed of a core material of kenaf was obtained in the same manner as the above-mentioned Example 1.

After that, raw-material pellets (apparent specific gravity: 1.03) were prepared in the same manner as the above-mentioned Example 1.

Subsequently, a mixture of the raw-material pellets and the thermoplastic-resin pellets was obtained in the same manner as the above-mentioned Example 1 except that 4.0 kg of the raw-material pellets and 2.7 kg of polylactic-acid pellets (average grain size: 3.0 mm, apparent specific gravity: 1.26) were used.

Then, the mixture obtained was extruded by the twin screw extruder in the same manner as the above-mentioned Example 1, and thus, pellets composed of the plant-derived composite material (plant-derived material:thermoplastic resin=60:40 (% by weight)) were obtained.

Comparative Example 1

A plant-derived material composed of a core material of kenaf was obtained in the same manner as the above-mentioned Example 1.

After that, 1.5 kg of the obtained plant-derived material (which is composed of the core material of the kenaf, having an average grain size of 200 μm and apparent specific gravity of 0.16) and 1.0 kg of polypropylene pellets (average grain size: 3.0 mm, apparent specific gravity: 0.9) were mixed using the SUPERMIXER in the same manner as in the above-mentioned Example 1 to obtain a mixture.

Then, the mixture obtained was extruded by the twin screw extruder in the same manner as the above-mentioned Example 1, and thus, pellets composed of the plant-derived composite material (plant-derived material:thermoplastic resin=60:40 (% by weight)) were obtained.

[2] Evaluation of Plant-Derived Composite Material Molded Article

The extruder was operated while each of the materials (plant-derived composite materials) obtained in the above-mentioned Examples 1 to 4 and Comparative Example 1 was fed into the extruder, and it was visually checked in what kind of state the material was extruded so as to evaluate the dispersibility of the plant-derived material and the thermoplastic resin. When the dispersibility of the plant-derived material and the thermoplastic resin is insufficient (uneven dispersibility), dense portions (lump) in which the plant-derived materials exist in a densely-arranged state are formed. The dense portion has low fluidity or no fluidity, and hence, in the case of continuous extrusion, the dense portions gradually collect at a discharge port of the extruder. Consequently, the discharge port is clogged or an unevenly-extruded part containing a large amount of the dense portions is produced, whereby it is impossible to extrude continuously. Accordingly, with continuous extrusion and observation of discharge condition, the above-mentioned dispersibility can be evaluated.

A die having a diameter of 3.0 mm was used mounting on a discharge port of an extruder ("BTN-30-S2-42-L" manufactured by PLABOR Co., Ltd., φ30 mm, L/D=42), and 3.0 kg of each material obtained in Examples and Comparative Example was extruded under the extruding condition of a cylinder temperature of 190° C., rotational speed of 200 rpm, and a feed rate of 3.0 kg/hour. The extruding state of total amount of each material was observed. As a result, when the material was continuously extruded from the discharge port of the extruder, "O" is indicated in the column of "Dispersibility" shown in Table 1. On the other hand, when the material was not extruded or intermittently extruded, "X" is indicated in the column of "Dispersibility" shown in Table 1. The results are described in Table 1.

Further, with respect to Examples 1, 2 and 4, an index number regarding productivity was calculated from a perspective that how much the amount of the plant-derived material could be fed. Specifically, it was calculated how much larger the plant-derived material could be fed in Examples 1, 2 and 4, compared to Comparative Example 1 in which 1.5 kg of the plant-derived material was able to be fed. Then, the calculated values are indicated in the column of "Productivity" shown in Table 1.

TABLE 1

| | Plant-derived material (Kenaf core) | | Thermoplastic | Plant-derived material | Thermoplastic resin | | | |
|---|---|---|---|---|---|---|---|---|
| | Form | Specific gravity | resin Type | blending amount | blending amount | Total amount | Dispersibility | Productivity |
| Example 1 | Pellet | 1.03 | polypropylene | 4.0 | 2.7 | 6.7 | O | 2.7 times |
| Example 2 | Pellet | 0.7 | polypropylene | 3.0 | 2.0 | 5.0 | O | 2.0 times |

TABLE 1-continued

| | Plant-derived material (Kenaf core) | | Thermoplastic | Plant-derived material | Thermoplastic resin | | | |
|---|---|---|---|---|---|---|---|---|
| | Form | Specific gravity | resin Type | blending amount | blending amount | Total amount | Dispersi- bility | Produc- tivity |
| Example 3 | Pellet | 1.03 | polypropylene | 5.0 | 2.5 | 7.5 | ○ | — |
| Example 4 | Pellet | 1.26 | polylactic acid | 4.0 | 2.7 | 6.7 | ○ | 2.7 times |
| Comparative Example 1 | Powder | 0.16 | polypropylene | 1.5 | 1.0 | 2.5 | X | — |

From the result of Comparative Example 1 shown in Table 1, it is found that sufficient dispersibility was not obtained because of no pelletizing process. On the other hand, in each of Examples 1 to 4 in which the pelletizing process was performed, it is found that sufficient dispersibility was obtained.

In addition, the plant-derived material was not pelletized in Comparative Example 1, and hence, the plant-derived material was bulky, and only 1.5 kg thereof could be fed into the SUPERMIXER at the maximum. On the other hand, the plant-derived material of 4.0 kg corresponding to 2.7 times of the amount in Comparative Example 1, the plant-derived material of 3.0 kg corresponding to 2.0 times of the amount in Comparative Example 1, and the plant-derived material of 4.0 kg corresponding to 2.7 times of the amount in Comparative Example 1 could be fed, respectively in Examples 1, 2 and 4. In other words, in each of Examples 1, 2 and 4, a large amount of the plant-derived material which was 2.0 times or more larger than the amount of the material in Comparative Example 1 could be fed at once, and it is found that high productive efficiency was obtained.

INDUSTRIAL APPLICABILITY

The plant-derived composite material of the present invention and a molded article making use thereof are widely utilized in automobile-related fields and construction-related fields. In the automobile-related fields, it is preferable for interior materials, exterior materials, structural materials and the like of automobiles. That is, the molded article may be used as a door trim, various instrument panels, a seat structural material, a seat-back board, a console box, a dashboard, a deck trim and the like. In addition, the plant-derived composite material and the molded article are also utilized in various travel means and transportation means such as railway vehicles, marine vessels and aircrafts in the same manner as automobiles. Furthermore, in the construction-related fields, it is preferable to use the plant-derived composite material and the molded article as interior materials, exterior materials, structural materials and the like of various buildings. That is, the molded article may be used as a door surface decorative material, a door structural material, and surface decorative materials, structural materials and the like of various types of furniture (a desk, a chair, a shelf, a chest and the like).

The invention claimed is:

1. A method for production of a molded article composed of a plant-derived composite material that comprises a plant-derived material containing at least one material selected from the group consisting of a ligneous material and a non-ligneous material, and a thermoplastic resin, the method comprising:
   a pelletizing process in which said plant-derived material is pressed to obtain raw-material pellets;
   a kneading process in which said raw-material pellets and said thermoplastic resin are kneaded to obtain a plant-derived composite material; and
   a molding process in which said plant-derived composite material is molded into a molded article composed of said plant-derived composite material,
   wherein said plant-derived composite material contains said plant-derived material in an amount of 50% or more by weight when said plant-derived composite material is assumed to be 100% by weight in total.

2. The method for production of a plant-derived composite material molded article according to claim 1, wherein said plant-derived material has an apparent specific gravity lower than an apparent specific gravity of said thermoplastic resin.

3. The method for production of a plant-derived composite material molded article according to claim 1, wherein a ratio of A to B (A/B) is 0.4 or less when the apparent specific gravity of said plant-derived material is expressed as A and the apparent specific gravity of said thermoplastic resin is expressed as B.

4. The method for production of a plant-derived composite material molded article according to claim 3, wherein a ratio of C to B (C/B) is 0.5 or more when an apparent specific gravity of said raw-material pellets is expressed as C and the apparent specific gravity of said thermoplastic resin is expressed as B.

5. The method for production of a plant-derived composite material molded article according to claim 1, wherein said plant-derived composite material contains a core material of kenaf as said ligneous material.

6. A plant-derived composite material molded article which is manufactured by the method according to claim 1.

* * * * *